US009132318B2

(12) United States Patent
Sullivan et al.

(10) Patent No.: US 9,132,318 B2
(45) Date of Patent: Sep. 15, 2015

(54) MULTI-LAYER CORE GOLF BALL

(71) Applicant: Acushnet Company, Fairhaven, MA (US)

(72) Inventors: Michael J. Sullivan, Old Lyme, CT (US); Douglas S. Goguen, New Bedford, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 165 days.

(21) Appl. No.: 14/035,074

(22) Filed: Sep. 24, 2013

(65) Prior Publication Data
US 2015/0038265 A1    Feb. 5, 2015

Related U.S. Application Data

(63) Continuation-in-part of application No. 13/958,854, filed on Aug. 5, 2013.

(51) Int. Cl.
*A63B 37/06* (2006.01)
*A63B 37/00* (2006.01)

(52) U.S. Cl.
CPC ......... *A63B 37/0092* (2013.01); *A63B 37/0043* (2013.01); *A63B 37/0045* (2013.01); *A63B 37/0046* (2013.01); *A63B 37/0061* (2013.01); *A63B 37/0062* (2013.01); *A63B 37/0064* (2013.01); *A63B 37/0065* (2013.01)

(58) Field of Classification Search
CPC .................................................. A63B 37/0063
USPC ......................................................... 473/376
See application file for complete search history.

(56) References Cited

U.S. PATENT DOCUMENTS

| 6,425,833 | B1 | 7/2002 | Sullivan et al. |
| 6,695,718 | B2 | 2/2004 | Nesbitt |
| 6,849,006 | B2 | 2/2005 | Cavallaro et al. |
| 7,410,429 | B1 | 8/2008 | Bulpett et al. |
| 8,007,376 | B2 | 8/2011 | Sullivan et al. |
| 8,182,368 | B2 | 5/2012 | Kamino et al. |

*Primary Examiner* — Raeann Gorden
(74) *Attorney, Agent, or Firm* — Mandi B. Milbank

(57) ABSTRACT

Golf balls having a very high positive gradient multilayer core are provided. The multilayer core includes an outer core layer and a very soft, low compression inner core layer. The inner core layer is formed from an unfoamed composition and has a center hardness that is at least 40 Shore C points less than the outer surface hardness of the outer core layer.

20 Claims, No Drawings

MULTI-LAYER CORE GOLF BALL

CROSS-REFERENCE TO RELATED APPLICATIONS

The present application is a continuation-in-part of U.S. patent application Ser. No. 13/958,854, filed Aug. 5, 2013, the entire disclosure of which is hereby incorporated herein by reference.

FIELD OF THE INVENTION

The present invention relates to multi-layer golf balls having a very high positive gradient core, including a very soft, low compression inner core layer formed from an unfoamed composition.

BACKGROUND OF THE INVENTION

U.S. Pat. No. 8,182,368 to Kamino et al. discloses a golf ball wherein the difference between the JIS-C hardness H4 of the core at its surface and the JIS-C hardness H3 of the core outer layer at its innermost portion is equal to or greater than 10.

U.S. Pat. No. 8,007,376 to Sullivan et al. discloses a golf ball having an inner core layer with a negative hardness gradient and an outer core layer with a positive hardness gradient.

U.S. Pat. No. 7,410,429 to Bulpett et al. discloses a golf ball wherein the hardness of the inner core outer surface is the same as or lower than the hardness of the geometric center and the hardness of the outer core layer outer surface is greater than the hardness of the inner surface.

U.S. Pat. No. 6,695,718 to Nesbitt discloses a golf ball including a center core component preferably formed from a sulfur-cured polybutadiene and a core layer component preferably formed from a peroxide-cured polybutadiene and a metal salt of a fatty acid.

Despite these, and additional disclosures of golf balls having various hardness gradient properties, there remains a need for a very high positive gradient core, including a very soft, low compression inner core layer formed from an unfoamed composition. Such core would provide good durability while also contributing to spin reduction.

SUMMARY OF THE INVENTION

In one embodiment, the present invention is directed to a golf ball comprising a core and a cover. The core consists of an inner core layer, one or more optional intermediate core layers, and an outer core layer. The inner core layer is a solid layer formed from an unfoamed first polybutadiene composition and has a diameter of 1.10 inch or less and a center Shore C hardness of 40 or less. The outer core layer is formed from a second polybutadiene composition and has a thickness of 0.150 inches or greater and an outer surface Shore C hardness of 80 or greater. The outer surface hardness of the outer core layer is at least 40 Shore C points greater than the center hardness of the inner core layer. The core has a gradient quotient, Q, of from 7 to 12, as defined by the equation:

$$\frac{G+T}{10 \times COR} = Q$$

where G is the hardness gradient of the core in Shore C as defined by $H_{outer\ surface}$ minus $H_{center}$, T is the percent of trans-polybutadiene isomer at the surface of the outer core layer, and COR is the coefficient of restitution of the core measured at an incoming velocity of 125 ft/s.

In another embodiment, the present invention is directed to a golf ball comprising a core and a cover. The core consists of an inner core layer, one or more optional intermediate core layers, and an outer core layer. The inner core layer is a solid layer formed from an unfoamed first polybutadiene composition and has a diameter of 1.10 inch or less and a center Shore C hardness of 30 or less. The outer core layer is formed from a second polybutadiene composition and has a thickness of 0.150 inches or greater and an outer surface Shore C hardness of 80 or greater. The outer surface hardness of the outer core layer is at least 50 Shore C points greater than the center hardness of the inner core layer. The core has a gradient quotient, Q, of from 7 to 12, as defined by the equation:

$$\frac{G+T}{10 \times COR} = Q$$

where G is the hardness gradient of the core in Shore C as defined by $H_{outer\ surface}$ minus $H_{center}$, T is the percent of trans-polybutadiene isomer at the surface of the outer core layer, and COR is the coefficient of restitution of the core measured at an incoming velocity of 125 ft/s.

DETAILED DESCRIPTION

A golf ball having a very high positive hardness gradient core is disclosed. The core comprises an inner core layer, an outer core layer, and optionally one or more intermediate core layers. The inner core layer has a very low center Shore C hardness ($H_{center}$) of 40 or less, or less than 40, or 35 or less, or less than 35, or 30 or less, or less than 30, or 25 or less or less than 25, or 20 or less, or less than 20, or 15 or less, or less than 15, or 13 or less, or less than 13, or a Shore C hardness within a range having a lower limit of 5 or 10 and an upper limit of 15 or 25 or 30 or 35 or 40. The outer core layer has a high outer surface Shore C hardness ($H_{outer\ surface}$) of 70 or greater, or greater than 70, or 75 or greater, or greater than 75, 80 or greater, or greater than 80, or 85 or greater, or greater than 85, or 87 or greater, or greater than 87, or 89 or greater, or greater than 89, or 90 or greater, or greater than 90, or 91 or greater, or greater than 91, or 92 or greater, or greater than 92, or a Shore C hardness within a range having a lower limit of 80 or 85 or 87 or 89 and an upper limit of 90 or 91 or 92 or 95. The resulting multilayer core has an overall very high positive hardness gradient wherein $H_{outer\ surface} - H_{center} \geq 50$, or $H_{outer\ surface} - H_{center} > 50$, or $H_{outer\ surface} - H_{center} \geq 55$, or $H_{outer\ surface} - H_{center} > 55$, or $H_{outer\ surface} - H_{center} \geq 60$, or $H_{outer\ surface} - H_{center} > 60$, or $H_{outer\ surface} - H_{center} \geq 65$, or $H_{outer\ surface} - H_{center} > 65$, or $H_{outer\ surface} - H_{center} \geq 70$, or $H_{outer\ surface} - H_{center} > 70$, or $H_{outer\ surface} - H_{center} \geq 75$, or $H_{outer\ surface} - H_{center} > 75$, or $H_{outer\ surface} - H_{center} \geq 80$, or $H_{outer\ surface} - H_{center} > 80$.

The inner core layer has a diameter of 1.10 inches or less, or less than 1.10 inches, or 1.00 inches or less, or less than 1.00 inches, or 0.90 inches or less, or less than 0.90 inches, or 0.80 inches or less, or less than 0.80 inches, or 0.75 inches or less, or less than 0.75 inches, or a diameter within a range having a lower limit of 0.10 or 0.15 or 0.20 or 0.25 or 0.30 or 0.35 or 0.40 or 0.45 or 0.50 or 0.55 inches and an upper limit of 0.60 or 0.65 or 0.70 or 0.75 or 0.80 or 0.85 or 0.90 or 0.95 or 1.00 or 1.05 or 1.10 inches. The outer core layer has a thickness of 0.10 inches or greater, or greater than 0.10 inches, or 0.15 or greater, or greater than 0.15, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.150 or 0.200 or 0.250 inches and an upper limit of 0.300 or 0.350 or 0.400 or 0.450 or 0.500 inches. Optional intermediate core layers are disposed between the inner core layer and outer core layer and have an individual layer thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 or 0.150 or 0.200 or 0.250 or inches. The multilayer core has an overall diameter of 1.00 inch or greater, or 1.20 inches or greater, or 1.25 inches or greater, or 1.30 inches or greater, or 1.35 inches or greater, or 1.40 inches or greater, or 1.45 inches or greater, or 1.50 inches or greater, or 1.51 inches or greater, or 1.53 inches or greater, or 1.55 inches or greater, or an overall diameter within a range having a lower limit of 0.50 or 0.70 or 0.75 or 0.80 or 0.85 or 0.90 or 0.95 or 1.00 or 1.10 or 1.15 or 1.20 or 1.25 or 1.30 or 1.35 or 1.40 or 1.45 or 1.50 or 1.51 or 1.53 or 1.55 and an upper limit of 1.55 or 1.60 or 1.61 or 1.62 or 1.63 or 1.64 inches.

The inner core layer has a negative hardness gradient wherein the interface Shore C hardness of the inner core layer is less than the center Shore C hardness, or a zero hardness gradient wherein the interface Shore C hardness of the inner core layer is within 1 Shore C unit of the center Shore C hardness, or positive hardness gradient wherein the interface Shore C hardness of the inner core layer is greater than the center Shore C hardness. The interface hardness of the inner core layer is defined herein as the hardness at a distance of 1 mm inward from the outer surface of the inner core layer. In a particular embodiment, the inner core layer has a center Shore C hardness ($H_{center}$) within a range having a lower limit of 1 or 5 or 10 and an upper limit of 15 or 25 or 30 or 35 or 40 and an interface Shore C hardness ($H_{inner\ core\ interface}$) within a range having a lower limit of 5 or 10 or 15 and an upper limit of 15 or 20 or 25 or 30 or 35 or 40 or 50, and has an overall zero hardness gradient, or a positive hardness gradient wherein $1 < H_{inner\ core\ interface} - H_{center} < 45$, or $1 < H_{inner\ core\ interface} - H_{center} < 15$, or $1 < H_{inner\ core\ interface} - H_{center} < 5$.

In a particular embodiment, the inner core layer has a compression of 40 or less, or 30 or less, or 25 or less, or less than 25, or 20 or less, or less than 20, or 15 or less, or less than 15, or 10 or less, or less than 10, or 5 or less, or less than 5, or 0 or less, or less than 0, and the core has an overall compression of 60 or greater, or 65 or greater, or 70 or greater, or 80 or greater, or greater than 80, or 85 or greater, or greater than 85, or 90 or greater, or an overall compression within a range having a lower limit of 60 or 65 or 70 or 80 or 85 and an upper limit of 90 or 95 or 100 or 110.

The solid inner core layer is formed from an unfoamed composition selected from thermoset and thermoplastic compositions that can be formulated to provide a very soft, low compression center.

Rubber compositions suitable for forming the inner core layer include a base rubber selected from natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations of two or more thereof. Diene rubbers are preferred, particularly polybutadiene, styrene-butadiene, acrylonitrile butadiene, and mixtures of polybutadiene with other elastomers wherein the amount of polybutadiene present is at least 40 wt % based on the total polymeric weight of the mixture.

Non-limiting examples of suitable commercially available rubbers are Buna CB high-cis neodymium-catalyzed polybutadiene rubbers, such as Buna CB 23, Buna CB24, and Buna CB high-cis cobalt-catalyzed polybutadiene rubbers, such as Buna CB 1203, 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistalon® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; Hypalon® chlorosulfonated polyethylene rubbers, commercially available from E. I. du Pont de Nemours and Company; and Goodyear Budene® 1207 polybutadiene, commercially available from Goodyear Chemical.

The rubber is crosslinked using, for example, a peroxide or sulfur cure system, C—C initiators, high energy radiation sources capable of generating free radicals, or a combination thereof.

In a particular embodiment, the rubber is crosslinked using a peroxide initiator and optionally a coagent. Suitable peroxide initiators include, but are not limited to, organic peroxides, such as dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. Examples of suitable commercially available peroxides include, but are not limited to Perkadox® BC dicumyl peroxide, commercially available from Akzo Nobel, and Varox® peroxides, such as Varox® ANS benzoyl peroxide and Varox® 231 1,1-di(t-butylperoxy)3,3,5-trimethylcyclohexane, commercially available from RT Vanderbilt Company, Inc.

Coagents are commonly used with peroxides to increase the state of cure. Suitable coagents include, but are not limited to, metal salts of unsaturated carboxylic acids; unsaturated vinyl compounds and polyfunctional monomers (e.g., trimethylolpropane trimethacrylate); maleimides (e.g., phenylene bismaleimide); and combinations thereof. Particular examples of suitable metal salts of unsaturated carboxylic acids include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the coagent is selected from zinc salts of acrylates, diacrylates, methacrylates, dimethacrylates, and mixtures thereof. In another particular embodiment, the coagent is zinc diacrylate.

The amount of peroxide initiator and coagent can be varied to achieve the desired hardness. For example, in one embodiment, the inner core layer composition is a peroxide-cured rubber comprising from 0.25 to 1.50 phr of a peroxide initiator and is free of coagent, substantially free of coagent (i.e., <1 phr coagent), or includes a low level of coagent (e.g., 10 phr or less, or less than 10 phr, or 5 phr or less, or less than 5 phr, or 1 phr or less, or less than 1 phr.

In another particular embodiment, the rubber is crosslinked using sulfur and/or an accelerator. Suitable accelerators include, but are not limited to, guanidines (e.g., diphenyl guanidine, triphenyl guanidine, and di-ortho-tolyl guanidine); thiazoles (e.g., mercaptobenzothiazole, dibenzothiazyldisulfide, sodium salt of mercaptobenzothiazole, zinc salt of mercaptobenzothiazole, and 2,4-dinitrophenyl mercaptobenzothiazole); sulfenamides (e.g., N-cyclohexylbenzothiazylsulfenamide, N-oxydiethylbenzothiazylsulfenamide, N-t-butylbenzothiazylsulfenamide, and N,N'-dicyclohexylbenzothiazylsulfenamide); thiuram sulfides (e.g., tetramethyl thiuram disulfide, tetraethyl thiuram disulfide, tetrabutylthiuram disulfide, tetramethyl thiuram monosulfide, dipentamethylene thiuram tetrasulfate, 4-morpholinyl-2-benzothiazole disulfide, and dipentamethylenethiuram hexasulfide); dithiocarbamates (e.g., piperidine pentamethylene dithiocarbamate, zinc diethyl dithiocarbamate, sodium diethyl dithiocarbamate, zinc ethyl phenyl dithiocarbamate, and bismuth dimethyldithiocarbamate); thioureas (e.g., ethylene thiourea, N,N'-diethylthiourea, and N,N'-diphenylthiourea); xanthates (e.g., zinc isopropyl xanthate, sodium isopropyl xanthate, and zinc butyl xanthate); dithiophosphates; and aldehyde amines (e.g., hexamethylene tetramine and ethylidene aniline).

The crosslinking system optionally includes one or more activators selected from metal oxides (e.g., zinc oxide and magnesium oxide), and fatty acids and salts of fatty acids (e.g., stearic acid, zinc stearate, oleic acid, and dibutyl ammonium oleate).

The rubber composition optionally includes a scorch retarder to prevent scorching of the rubber during processing before vulcanization. Suitable scorch retarders include, but are not limited to, salicylic acid, benzoic acid, acetylsalicylic acid, phthalic anhydride, sodium acetate, and N-cyclohexylthiophthalimide.

The rubber composition optionally includes one or more antioxidants to inhibit or prevent the oxidative degradation of the base rubber. Some antioxidants also act as free radical scavengers; thus, when antioxidants are included in the composition, the amount of initiator agent used may be as high as or higher than the amounts disclosed herein. Suitable antioxidants include, but are not limited to, hydroquinoline antioxidants, phenolic antioxidants, and amine antioxidants.

The rubber composition optionally includes from 0.05 phr to 10.0 phr of a soft and fast agent selected from organosulfur and metal-containing organosulfur compounds; organic sulfur compounds, including mono, di, and polysulfides, thiol, and mercapto compounds; inorganic sulfide compounds; blends of an organosulfur compound and an inorganic sulfide compound; Group VIA compounds; substituted and unsubstituted aromatic organic compounds that do not contain sulfur or metal; aromatic organometallic compounds; hydroquinones; benzoquinones; quinhydrones; catechols; resorcinols; and combinations thereof. In a particular embodiment, the soft and fast agent is selected from zinc pentachlorothiophenol, pentachlorothiophenol, ditolyl disulfide, diphenyl disulfide, dixylyl disulfide, 2-nitroresorcinol, and combinations thereof.

The rubber composition optionally contains one or more fillers. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, core material that is ground and recycled, nanofillers and combinations thereof.

The rubber composition may also contain one or more additives selected from processing aids, such as transpolyisoprene (e.g., TP-301 transpolyisoprene, commercially available from Kuraray Co., Ltd.), transbutadiene rubber, and polyalkenamer rubber; processing oils; plasticizers; coloring agents; fluorescent agents; chemical blowing and foaming agents; defoaming agents; stabilizers; softening agents; impact modifiers; free radical scavengers; antiozonants (e.g., p-phenylenediames); and the like. The amount of additive(s) typically present in the rubber composition is typically within a range having a lower limit of 0 parts or 5 parts by weight per 100 parts of the base polymer, and an upper limit of 10 parts or 20 parts or 50 parts or 100 parts or 150 parts by weight per 100 parts of the base polymer.

In a particular embodiment, the inner core layer composition is a rubber composition consisting essentially of polybutadiene, from 0.25 to 1.50 phr of a peroxide, and optionally one or more of: coagent, metal oxide, metal carbonate, filler(s), additive(s), and processing aids. In a particular aspect of this embodiment, the inner core layer has a coefficient of restitution ("COR") at 125 ft/s of 0.700 or less, or 0.650 or less, or 0.600 or less, or 0.550 or less, and the core has an overall COR of 0.795 or greater, or 0.800 or greater, or 0.810 or greater, or 0.815 or greater, or 0.820 or greater. In another particular aspect of this embodiment, the trans content of the rubber inner core layer composition is 2% or less, or less than 2%, at the center and 2% or less, or less than 2%, at the surface of the inner core layer.

Suitable types and amounts of rubber, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Thermoplastic compositions suitable for forming the inner core layer include ionomers; non-ionomeric acid polymers, such as E/Y- and E/X/Y-type copolymers, wherein E is an a-olefin (e.g., ethylene), Y is a carboxylic acid such as acrylic, methacrylic, crotonic, maleic, fumaric, or itaconic acid, and X is a softening comonomer such as vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations of any two or more of the above thermoplastic polymers.

Ionomers, including partially neutralized ionomers and highly neutralized ionomers (HNPs), and ionomers formed from blends of two or more partially neutralized ionomers, blends of two or more highly neutralized ionomers, and blends of one or more partially neutralized ionomers with one or more highly neutralized ionomers, are particularly suitable for forming the core layers. For purposes of the present disclosure, "HNP" refers to an acid copolymer after at least 80% of all acid groups present in the composition are neutralized. Preferred ionomers are salts of E/X- and E/X/Y-type acid copolymers, wherein E is an a-olefin (e.g., ethylene), X is a $C_3$-$C_8$ α,β-ethylenically unsaturated carboxylic acid, and Y is a softening monomer. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Particularly preferred E/X/Y-type copolymers are ethylene/(meth) acrylic acid/n-butyl (meth) acrylate, ethylene/(meth) acrylic acid/isobutyl (meth) acrylate, ethylene/(meth) acrylic acid/methyl (meth) acrylate, and ethylene/(meth) acrylic acid/ethyl (meth) acrylate. As used herein, "(meth) acrylic acid" means methacrylic acid and/or acrylic acid. Likewise, "(meth) acrylate" means methacrylate and/or acrylate. The a-olefin is typically present in the acid copolymer in an amount of 15 wt % or greater, or 25 wt % or greater, or 40 wt % or greater, or 60 wt % or greater, based on the total weight of the acid copolymer. The acid is typically present in the acid copolymer in an amount of 6 wt % or greater, or 9 wt % or greater, or 10 wt % or greater, or 11 wt % or greater, or 15 wt % or greater, or 16 wt % or greater, or in an amount within a range having a lower limit of 1 or 4 or 5 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The optional softening monomer is typically present in the acid copolymer in an amount within a range having a lower limit of 0 or 1 or 3 or 5 or 11 or 15 or 20 wt % and an upper limit of 23 or 25 or 30 or 35 or 50 wt %, based on the total weight of the acid copolymer.

The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Suitable ionomers are further disclosed, for example, in U.S. Patent Application Publication Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

Thermoplastic compositions of the present invention optionally include additive(s) and/or filler(s) in an amount of 50 wt % or less, or 30 wt % or less, or 20 wt % or less, or 15 wt % or less, based on the total weight of the thermoplastic composition. Suitable additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof (e.g., stearic acid, oleic acid, zinc stearate, magnesium stearate, zinc oleate, and magnesium oleate), and fillers, such as zinc oxide, tin oxide, barium sulfate, zinc sulfate, calcium oxide, calcium carbonate, zinc carbonate, barium carbonate, tungsten, tungsten carbide, silica, lead silicate, clay, mica, talc, nano-fillers, carbon black, glass flake, milled glass, flock, fibers, and mixtures thereof. Suitable additives are more fully described in, for example, U.S. Patent Application Publication No. 2003/0225197, the entire disclosure of which is hereby incorporated herein by reference. In a particular embodiment, the total amount of additive(s) and filler(s) present in the thermoplastic composition is 20 wt % or less, or 15 wt % or less, or 12 wt % or less, or 10 wt % or less, or 9 wt % or less, or 6 wt % or less, or 5 wt % or less, or 4 wt % or less, or 3 wt % or less, or within a range having a lower limit of 0 or 2 or 3 or 5 wt %, based on the total weight of the thermoplastic composition, and an upper limit of 9 or 10 or 12 or 15 or 20 wt %, based on the total weight of the thermoplastic composition. In a particular aspect of this embodiment, the thermoplastic composition includes filler(s) selected from carbon black, microand nano-scale clays and organoclays, including (e.g., Cloisite® and Nanofil® nanoclays, commercially available from Southern Clay Products, Inc.; Nanomax® and Nanomer® nanoclays, commercially available from Nanocor, Inc., and Perkalite® nanoclays, commercially available from Akzo Nobel Polymer Chemicals), micro- and nano-scale talcs (e.g., Luzenac HAR® high aspect ratio talcs, commercially available from Luzenac America, Inc.), glass (e.g., glass flake, milled glass, microglass, and glass fibers), micro- and nano-scale mica and mica-based pigments (e.g., Iriodin® pearl luster pigments, commercially available from The Merck Group), and combinations thereof. Particularly suitable combinations of fillers include, but are not limited to, micro-scale filler(s) combined with nano-scale filler(s), and organic filler(s) with inorganic filler(s).

Examples of commercially available thermoplastics suitable for forming the inner core layer include, but are not limited to, Surlyn® ionomer resins, Hytrel® thermoplastic polyester elastomers, ionomeric materials sold under the trade names DuPont® HPF 1000 and HPF 2000, Nucrel® acid copolymer resins, Fusabond® metallocene-catalyzed polyethylenes, Fusabond® functionalized ethylene acrylate copolymers, Fusabond® functionalized ethylene vinyl acetate copolymers, Fusabond® anhydride modified HDPEs, Fusabond® random ethylene copolymers, Fusabond® chemically modified ethylene elastomers, and Fusabond® functionalized polypropylenes, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; Pebax® thermoplastic polyether and polyester amides, Lotader® ethylene/acrylic ester/maleic anhydride random terpolymers and Lotader® ethylene/ethyl acrylate/maleic anhydride random terpolymers, all of which are commercially available from Arkema Inc.; Kraton® linear triblock copolymers based on styrene and ethylene/butylene, commercially available from Kraton Performance Polymers Inc.; and Riteflex® polyester elastomers, commercially available from Ticona.

The inner and outer core layers are formulated to have different properties; however, they can be formed from the same or different types of compositions. For example, in a particular embodiment, the inner core layer is formed from a first polybutadiene composition and the outer core layer is formed from a second polybutadiene composition. In another particular embodiment, the inner core layer is formed from a polybutadiene and the outer core layer is formed from an ionomer composition. Thus, compositions suitable for forming the outer core layer include those inner core layer compositions disclosed above that can be formulated to provide an outer core surface hardness such that the core has an overall very high positive hardness gradient.

In a particular embodiment, the inner core layer is formed from a first polybutadiene composition, the outer core layer is formed from a second polybutadiene composition, and the overall core has a gradient quotient, Q, of from 7 to 12, as defined by the equation:

$$\frac{G+T}{10 \times COR} = Q$$

where G is the hardness gradient of the core in Shore C as defined by surface hardness of the outer core layer minus center hardness and is preferably from 60 to 90, T is the percent of trans-polybutadiene isomer at the surface of the outer core layer and is preferably from 1 to 5, and COR is the coefficient of restitution of the core measured at an incoming velocity of 125 ft/s and is preferably from 0.790 to 0.840 or from 0.800 to 0.840.

The optional intermediate layer(s) are not limited by a particular composition for forming the layer(s), and can be formed from any suitable golf ball composition including, but not limited to, natural rubber; polybutadiene; polyisoprene; ethylene propylene rubber; ethylene-propylene-diene rubber; styrene-butadiene rubber; butyl rubber; halobutyl rubber; thermoset polyurethane; thermoset polyurea; acrylonitrile butadiene rubber; polychloroprene; alkyl acrylate rubber; chlorinated isoprene rubber; acrylonitrile chlorinated isoprene rubber; polyalkenamer rubber; polyester; polyacrylate; partially- and fully-neutralized ionomer; graft copolymer of ionomer and polyamide; polyester, particularly polyesters modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), including, but not limited to, those disclosed in U.S. Pat. Nos. 6,353,050, 6,274,298, and 6,001,930, the entire disclosures of which are hereby incorporated herein by reference; polyamides, polyamide-ethers, and polyamide-esters, including, but not limited to, those disclosed in U.S. Pat. Nos. 6,187,864, 6,001,930, and 5,981,654, the entire disclosures of which are hereby incorporated herein by reference; polyurethanes, polyureas, and polyurethane-polyurea hybrids, including, but not limited to, those disclosed in U.S. Pat. Nos. 5,334,673, 5,484,870, 6,506,851, 6,756,436, 6,835,794, 6,867,279, 6,960,630, and 7,105,623, U.S. Patent Application Publication No. 2007/0117923, and U.S. Patent Application Ser. No. 60/401,047 and Ser. No. 13/613,095, the entire disclosures of which are hereby incorporated herein by reference; fluoropolymers, including, but not limited to, those disclosed in U.S. Pat. Nos. 5,691,066, 6,747,110 and 7,009,002, the entire disclosures of which are hereby incorporated herein by reference; non-ionomeric acid polymers, i.e., E/X- and E/X/Y-type copolymers, including, but not limited to, those disclosed in U.S. Pat. No. 6,872,774, the entire disclosure of which is hereby incorporated herein by reference; metallocene-catalyzed polymers, including, but not limited to, those disclosed in U.S. Patent Nos. 6,274,669, 5,919,862, 5,981,654, and 5,703,166, the entire disclosures of which are hereby incorporated herein by reference; polystyrenes, such as poly(styrene-co-maleic anhydride), acrylonitrile-butadiene-styrene, poly(styrene sulfonate), polyethylene styrene; polypropylenes, polyethylenes, propylene elastomers, ethylene elastomers, and copolymers of propylene and ethylene; polyvinyl chlorides; polyvinyl acetates, preferably having less than about 9% of vinyl acetate by weight; polycarbonates, blends of polycarbonate/acrylonitrile-butadiene-styrene, blends of polycarbonate/polyurethane, and blends of polycarbonate/polyester; polyvinyl alcohols; polyethers, such as polyarylene ethers, polyphenylene oxides, and block copolymers of alkenyl aromatics with vinyl aromatics and poly(amic ester)s; polyimides, polyetherketones, and polyamideimides; polycarbonate/polyester copolymers; and combinations of two or more thereof.

In a particular embodiment, the core includes an intermediate layer formed from a rubber composition. In another particular embodiment, the core includes an intermediate layer formed from an HNP composition.

Thermoplastic core compositions are optionally treated or admixed with a thermoset diene composition to reduce or prevent flow upon overmolding. Optional treatments may also include the addition of peroxide to the material prior to molding, or a post-molding treatment with, for example, a crosslinking solution, electron beam, gamma radiation, isocyanate or amine solution treatment, or the like. Such treatments may prevent the intermediate layer from melting and flowing or "leaking" out at the mold equator, as thermoset layers are molded thereon at a temperature necessary to crosslink the thermoset layer, which is typically from 280° F. to 360° F. for a period of about 5 to 30 minutes.

The multi-layer core is enclosed with a cover, which may be a single-, dual-, or multi-layer cover, preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover is a single layer having a thickness of from 0.010 or 0.020 or 0.025 inches to 0.035 or 0.040 or 0.050 inches. In another particular embodiment, the cover consists of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

Suitable cover materials include, but are not limited to, polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from Exxon-Mobil Chemical Company; Amplify® IO ionomers of ethylene acrylic acid copolymers, commercially available from The Dow Chemical Company; and Clarix® ionomer resins, commercially available from A. Schulman Inc.); polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers, e.g., (meth)acrylic acid, which do not become part of an ionomeric copolymer; plastomers; flexomers; styrene/butadiene/styrene block copolymers; styrene/ethylene-butylene/styrene block copolymers; polybutadiene; styrene butadiene rubber; ethylene propylene rubber; ethylene propylene diene rubber; dynamically vulcanized elastomers; ethylene vinyl acetates; ethylene (meth) acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan® polyurethanes, commercially available from BASF; synthetic or natural vulcanized rubber; and combinations thereof.

Compositions comprising an ionomer or a blend of two or more ionomers are particularly suitable cover materials. Preferred ionomeric cover compositions include:

(a) a composition comprising a "high acid ionomer" (i.e., having an acid content of greater than 16 wt %), such as Surlyn 8150®;

(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn 8150® and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;

(c) a composition comprising a 50/45/5 blend of Surlyn® 8940/Surlyn® 9650/Nucrel® 960, preferably having a material hardness of from 80 to 85 Shore C;

(d) a composition comprising a 50/25/25 blend of Surlyn® 8940/Surlyn® 9650/Surlyn® 9910, preferably having a material hardness of about 90 Shore C;

(e) a composition comprising a 50/50 blend of Surlyn® 8940/Surlyn® 9650, preferably having a material hardness of about 86 Shore C;

(f) a composition comprising a blend of Surlyn® 7940/Surlyn® 8940, optionally including a melt flow modifier;

(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid copolymer or ester terpolymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140, 40-50 wt % Surlyn® 9120, and 0-10 wt % Surlyn® 6320).

Surlyn 8150®, Surlyn® 8940, and Surlyn® 8140 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, particularly to manipulate product properties. Examples of suitable non-ionic thermoplastic resins include, but are not limited to, polyurethane, poly-etherester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, plyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Ionomer golf ball cover compositions may include a flow modifier, such as, but not limited to, acid copolymer resins (e.g., Nucrel® acid copolymer resins, and particularly Nucrel® 960, commercially available from E. I. du Pont de Nemours and Company), performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof Suitable ionomeric cover materials are further disclosed, for example, in U.S. Pat. Nos. 6,653,382, 6,756,436, 6,894, 098, 6,919,393, and 6,953,820, the entire disclosures of which are hereby incorporated by reference.

Polyurethanes, polyureas, and blends and hybrids of polyurethane/polyurea are also particularly suitable for forming cover layers. Suitable polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Cover compositions may include one or more filler(s), such as titanium dioxide, barium sulfate, etc., and/or additive(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Suitable cover materials and constructions also include, but are not limited to, those disclosed in U.S. Patent Application Publication No. 2005/0164810, U.S. Pat. Nos. 5,919, 100, 6,117,025, 6,767,940, and 6,960,630, and PCT Publications WO00/23519 and WO00/29129, the entire disclosures of which are hereby incorporated herein by reference.

In a particular embodiment, the cover is a single layer, preferably formed from an ionomeric composition having a material hardness of 60 Shore D or greater or a material hardness of from 60 or 62 or 65 Shore D to 65 or 70 or 72 Shore D, and a thickness of 0.02 inches or greater or 0.03 inches or greater or 0.04 inches or greater or a thickness within a range having a lower limit of 0.010 or 0.015 or 0.020 inches and an upper limit of 0.035 or 0.040 or 0.050 inches.

In another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In another particular embodiment, the cover comprises an inner cover layer formed from an ionomeric composition and an outer cover layer formed from a thermosetting polyurethane- or polyurea-based composition. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover comprises an inner cover layer formed from an ionomeric composition and an outer cover layer formed from a thermoplastic composition selected from ionomer-, polyurethane-, and polyurea-based compositions. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover is a dual- or multi-layer cover including an inner or intermediate cover layer formed from an ionomeric composition and an outer cover layer formed from a polyurethane- or polyurea-based composition. The ionomeric layer preferably has a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer is preferably formed from a castable or reaction injection moldable polyurethane, polyurea, or copolymer or hybrid of polyurethane/polyurea. Such cover material is preferably thermosetting, but may be thermoplastic. The outer cover layer composition preferably has a material hardness of 85 Shore C or less, or 45 Shore D or less, or 40 Shore D or less, or from 25 Shore D to 40 Shore D, or from 30 Shore D to 40 Shore D. The outer cover layer preferably has a surface hardness within a range having a lower limit of 20 or 30 or 35 or 40 Shore D and an upper limit of 52 or 58 or 60 or 65 or 70 or 72 or 75 Shore D. The outer cover layer preferably has a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

A moisture vapor barrier layer is optionally employed between the core and the cover. Moisture vapor barrier layers are further disclosed, for example, in U.S. Pat. Nos. 6,632, 147, 6,838,028, 6,932,720, 7,004,854, and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

Thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

Golf balls of the present invention typically have a coefficient of restitution of 0.700 or greater, preferably 0.750 or greater, and more preferably 0.780 or greater. Golf balls of the present invention typically have a compression of 40 or greater, or a compression within a range having a lower limit of 50 or 60 and an upper limit of 100 or 120.

Golf balls of the present invention will typically have dimple coverage of 60% or greater, preferably 65% or greater, and more preferably 75% or greater.

The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is within a range having a lower limit of 1.680 inches and an upper limit of 1.740 or 1.760 or 1.780 or 1.800 inches.

Golf balls of the present invention preferably have a moment of inertia ("MOI") of 70-95 g·cm$^2$, preferably 75-93 g·cm$^2$, and more preferably 76-90 g·cm$^2$. For low MOI embodiments, the golf ball preferably has an MOI of 85 g·cm$^2$ or less, or 83 g·cm$^2$ or less. For high MOI embodiment, the golf ball preferably has an MOI of 86 g·cm$^2$ or greater, or 87 g·cm$^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low compression cores will not cause the spring to deflect by more than 1.25 mm and therefore have a zero or negative compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in *Compression by Any Other Name, Science and Golf IV, Proceedings of the World Scientific Congress of Golf* (Eric Thain ed., Routledge, 2002).

COR, as used herein, is determined according to a known procedure wherein a sphere is fired from an air cannon at two given velocities and calculated at a velocity of 125 ft/s. Ballistic light screens are located between the air cannon and the steel plate at a fixed distance to measure ball velocity. As the sphere travels toward the steel plate, it activates each light screen, and the time at each light screen is measured. This provides an incoming transit time period inversely proportional to the sphere's incoming velocity. The sphere impacts the steel plate and rebounds through the light screens, which again measures the time period required to transit between the light screens. This provides an outgoing transit time period inversely proportional to the sphere's outgoing velocity. COR is then calculated as the ratio of the outgoing transit time period to the incoming transit time period, $COR=V_{out}/V_{in}=T_{in}/T_{out}$.

The surface hardness of a golf ball layer is obtained from the average of a number of measurements taken from opposing hemispheres, taking care to avoid making measurements on the parting line of the core or on surface defects, such as holes or protrusions. Hardness measurements are made pursuant to ASTM D-2240 using a calibrated, digital durometer, capable of reading to 0.1 hardness units and set to record the maximum hardness reading obtained for each measurement.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness measurement at a distance of 1 mm inward from the outer surface of the inner core layer is defined herein as the interface hardness ($H_{inner\ core\ Interface}$).

The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

Hardness points should only be measured once at any particular geometric location.

It should be understood that there is a fundamental difference between "material hardness" and "hardness as measured directly on a golf ball." For purposes of the present disclosure, material hardness is measured according to ASTM D2240 and generally involves measuring the hardness of a flat "slab"

or "button" formed of the material. Hardness as measured directly on a golf ball (or other spherical surface) typically results in a different hardness value. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

PROPHETIC EXAMPLE

The examples below are for illustrative purposes only. In no manner is the present invention limited to the specific disclosures therein.

A soft, low compression inner core layer can be made as follows. A 0.60 inch diameter sphere of polybutadiene and from 0.1 to 2.0 phr peroxide is cured at 305-350° F. for 5-15 minutes. Filler, colorant, antioxidant, and small amounts (i.e., 5 phr or less) of zinc oxide and/or coagent (e.g., zinc diacrylate, zinc dimethacrylate, trimethylpropane triacrylate, etc.) are optionally added, for example, to increase reaction efficiency and to optimize hardness and compression. The resulting inner core layer has a center hardness of about 10 Shore C, and an outer surface hardness of about 20 Shore C, a positive hardness gradient of about 10, a compression of less than 0, and a COR of about 0.600.

An outer core layer having an outer diameter of about 1.530 inches and an outer surface hardness of about 90 C is formed thereon from a conventional polybutadiene golf ball composition. The resulting dual core has a compression of about 90 to about 100 and a COR of about 0.810.

The dual core is enclosed in an inner cover layer formed from an ionomer and an outer cover layer formed from a polyurethane.

Example

The examples below are for illustrative purposes only. In no manner is the present invention limited to the specific disclosures therein.

Soft, low compression centers were made by curing spheres of a polybutadiene composition at 305-350° F. for 5-15 minutes. The relative amount of each component used to form the center composition is given in Table 1 below. Amounts are reported in phr, unless otherwise indicated.

Outer core layers of various compositions were formed thereon to produce a dual core having an outer diameter of about 1.58 inches. The relative amounts of each component used to form the outer core layer compositions are given in Table 1, and are reported in phr, unless otherwise indicated.

Compression, COR, center hardness, and hardness at various distances from the center of each dual core were measured and the results are reported in Table 1 below.

TABLE 1

|  | Example 1 | Example 2 |
|---|---|---|
| Center Composition | | |
| Polybutadiene | 100 | 100 |
| Zinc oxide | 0 | 0 |
| Zinc diacrylate | 0 | 0 |
| Dicumyl peroxide | 0.5 | 0.5 |
| Zinc pentachlorothiophenol dispersion | 0 | 0 |
| Outer Core Layer Composition | | |
| Polybutadiene | 100 | 100 |
| Zinc oxide | 14.08 | 17.61 |
| Zinc diacrylate | 37 | 39 |
| Dicumyl peroxide | 0.5 | 0.5 |
| Zinc pentachlorothiophenol dispersion | 0.7 | 0.7 |
| Center diameter (inches) | 0.50 | 0.75 |
| Dual Core Properties | | |
| Compression (Atti) | 85 | 80 |
| Surface Hardness (Shore C) | 88.3 | 88.9 |
| Center Hardness (Shore C) | 16.9 | 17.9 |
| Calculated Hardness Gradient (Shore C) | 71.4 | 71.0 |
| COR | 0.820 | 0.813 |
| Hardness at various distances from center (Shore C) | | |
| 2 mm from center | 18.1 | 17.1 |
| 4 mm from center | 19.8 | 16.9 |
| 6 mm from center | 21.8 | 18.1 |
| 8 mm from center | 74.7 | 19.0 |
| 10 mm from center | 74.8 | 21.0 |
| 12 mm from center | 73.9 | 75.6 |
| 14 mm from center | 72.8 | 75.6 |
| 16 mm from center | 79.0 | 77.0 |
| 18 mm from center | 83.4 | 82.6 |

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a core and a cover, wherein the core consists of:

a solid inner core layer formed from an unfoamed first polybutadiene composition and having a diameter of 1.10 inch or less and a center Shore C hardness ($H_{center}$) of 40 or less, one or more optional intermediate core layers, and an outer core layer formed from a second polybutadiene composition and having a thickness of 0.150 inches or greater and an outer surface Shore C hardness ($H_{outer\ surface}$) of 80 or greater, wherein $H_{outer\ surface} > H_{center}$, and $H_{outer\ surface} - H_{center} \geq 40$, and wherein the core has a gradient quotient, Q, of from 7 to 12, as defined by the equation:

$$\frac{G+T}{10 \times COR} = Q$$

where G is the hardness gradient of the core in Shore C as defined by $H_{outer\ surface}$ minus $H_{center}$, T is the percent of trans-polybutadiene isomer at the surface of the outer core layer, and COR is the coefficient of restitution of the core measured at an incoming velocity of 125 ft/s.

2. The golf ball of claim 1, wherein the hardness gradient, G, is from 60 to 90.

3. The golf ball of claim 1, wherein the percent of trans-polybutadiene isomer at the surface of the outer core layer, T, is from 1 to 5.

4. The golf ball of claim 1, wherein the COR of the core is from 0.790 to 0.840.

5. The golf ball of claim 1, wherein $H_{outer\ surface} - H_{center} \geq 45$.

6. The golf ball of claim 1, wherein $H_{outer\ surface} - H_{center} \geq 55$.

7. The golf ball of claim 1, wherein $H_{outer\ surface} - H_{center} \geq 60$.

8. The golf ball of claim 1, wherein the inner core layer has a compression of <0.

9. The golf ball of claim 8, wherein the core has an overall compression of ≥70.

10. A golf ball comprising a core and a cover, wherein the core consists of:
   a solid inner core layer formed from an unfoamed first polybutadiene composition and having a diameter of 1.10 inch or less and a center Shore C hardness ($H_{center}$) of 30 or less,
   one or more optional intermediate core layers, and
   an outer core layer formed from a second polybutadiene composition and having a thickness of 0.150 inches or greater and an outer surface Shore C hardness ($H_{outer\ surface}$) of 80 or greater,
   wherein $H_{outer\ surface} \geq H_{center}$, and $H_{outer\ surfac} - H_{center} \geq 50$, and wherein the core has a gradient quotient, Q, of from 7 to 12, as defined by the equation:

$$\frac{G+T}{10 \times COR} = Q$$

where G is the hardness gradient of the core in Shore C as defined by $H_{outer\ surface}$ minus $H_{center}$, T is the percent of trans-polybutadiene isomer at the surface of the outer core layer, and COR is the coefficient of restitution of the core measured at an incoming velocity of 125 ft/s.

11. The golf ball of claim 10, wherein the hardness gradient, G, is from 60 to 90.

12. The golf ball of claim 10, wherein the percent of trans-polybutadiene isomer at the surface of the outer core layer, T, is from 1 to 5.

13. The golf ball of claim 10, wherein the COR of the core is from 0.790 to 0.840.

14. The golf ball of claim 10, wherein $H_{outer\ surfac} - H_{center} \geq 55$.

15. The golf ball of claim 10, wherein $H_{outer\ surfac} - H_{center} \geq 60$.

16. The golf ball of claim 10, wherein $H_{outer\ surfac} - H_{center} \geq 65$.

17. The golf ball of claim 10, wherein $H_{outer\ surfac} - H_{center} \geq 70$.

18. The golf ball of claim 10, wherein the inner core layer has a compression of <0.

19. The golf ball of claim 18, wherein the core has an overall compression of ≥70.

20. The golf ball of claim 10, wherein the inner core layer composition is a thermoset composition consisting essentially of:
   polybutadiene;
   from 0.1 phr to 2.0 phr of a peroxide;
   optionally 5 phr or less of a metal oxide;
   optionally 5 phr or less of a metal coagent;
   optionally 5 phr or less of a metal carbonate; and
   optionally one or more additional components selected from the group consisting of fillers, colorants, and antioxidants.

* * * * *